United States Patent [19]

Lahaije

[11] Patent Number: 5,592,665
[45] Date of Patent: Jan. 7, 1997

[54] METHOD AND APPARATUS FOR FAST ACCESSING OF DATA ITEMS FROM A SORTED LIST FOR USE WITH SUCH METHOD AND/OR APPARATUS

[75] Inventor: Paul D. M. E. Lahaije, Eindhoven, Netherlands

[73] Assignee: U.S. Philips Corporation, New York, N.Y.

[21] Appl. No.: 315,156

[22] Filed: Sep. 29, 1994

[30] Foreign Application Priority Data

Oct. 4, 1993 [EP] European Pat. Off. .............. 93202816

[51] Int. Cl.$^6$ .............................. G06F 12/08; G06F 17/30
[52] U.S. Cl. ................... 395/604; 395/404; 364/DIG. 1; 364/282.1; 364/283.2; 364/251.6
[58] Field of Search .................................... 395/600, 404; 364/DIG. 1

[56] References Cited

U.S. PATENT DOCUMENTS

| | | | |
|---|---|---|---|
| 4,606,002 | 8/1986 | Waisman et al. | 395/600 |
| 4,871,903 | 10/1989 | Carrell | 235/375 |
| 5,058,002 | 10/1991 | Nakamura et al. | 395/600 |
| 5,204,958 | 4/1993 | Cheng et al. | 395/600 |
| 5,253,361 | 10/1993 | Thurman et al. | 395/600 |
| 5,261,075 | 11/1993 | Ouchi et al. | 395/425 |
| 5,276,872 | 1/1994 | Lomet et al. | 395/600 |
| 5,319,629 | 6/1994 | Henshaw et al. | 369/103 |
| 5,408,654 | 4/1995 | Barry | 395/600 |

OTHER PUBLICATIONS

C. J. Date, "An Introduction To Database Systems", vol. I, pp. 58–67, 1986.

Primary Examiner—Thomas G. Black
Assistant Examiner—Jean R. Homere
Attorney, Agent, or Firm—Anne E. Barschall

[57] ABSTRACT

A method for accessing a data item from a data base has the full data base contained in a plurality of blocks in a slow background memory and furthermore has a faster foreground memory. Each data item has a label containing one or more elements. The data base furthermore has an index containing a second multiplicity of treewise organized index items each comprising an initial part of its label header, one or more secondary pointers and an indication of whether all data items having that initial part are contained in only one or in a plurality of blocks. First the index is accessed with the initial part of the label. If the index item pertaining to the latter initial part signals is contained in only a single block, the pointer in that index item points to that single block and the block is stored in the foreground memory. Extending the initial part to a full header identifies an intended subset of data items for accessing through its completed label. If the data items having the initial part are contained in a plurality of blocks, the pointer of the current index item points to a further index item of the tree having the current initial part extended by a next successor label element, whereupon the process repeats for the extended label header.

16 Claims, 2 Drawing Sheets

FIG.1

| PHYSICAL ADDRESS | LABEL | | | | | | | | | | | | |
|---|---|---|---|---|---|---|---|---|---|---|---|---|---|
| 0 | a | a | b | x | x | x | x | x | x | x | x | x | x |
| 1 | a | a | c | d | x | x | x | x | x | x | | | |
| 2 | a | a | f | x | x | x | x | x | | | | | |
| 3 | a | g | a | b | h | x | x | x | | | | | |
| 4 | a | z | a | a | a | a | x | x | x | x | | | |
| 5 | b | a | x | x | x | x | x | x | x | x | | | |
| 6 | b | a | a | x | x | x | x | x | | | | | |
| 7 | b | b | c | d | x | x | x | x | | | | | |
| 8 | b | b | d | x | x | x | x | | | | | | |
| 9 | b | c | x | x | x | x | | | | | | | |
| 10 | b | e | x | x | x | x | | | | | | | |
| 11 | c | a | x | x | x | | | | | | | | |
| 12 | d | e | x | x | x | | | | | | | | |
| 13 | d | f | f | x | x | | | | | | | | |
| 14 | e | e | x | x | x | | | | | | | | |
| 15 | e | f | x | x | x | | | | | | | | |

DATABASE
BLOCKS OF DATA

FIG.2

INDEX

| ADDRESS | LABEL ITEM | | QUALIFIER | |
|---|---|---|---|---|
| 0 | a | | p | 5 |
| 1 | b | | p | 8 |
| 2 | c | | s | 8 |
| 3 | d | | s | 12 |
| 4 | e | | s | 12 |
| 5 | a | a | s | 0 |
| 6 | a | g | s | 0 |
| 7 | a | z | s | 4 |
| 8 | b | a | s | 4 |
| 9 | b | b | p | 12 |
| 10 | b | c | s | 8 |
| 11 | b | e | e | s | 8 |
| 12 | b | b | c | s | 4 |
| 13 | b | b | d | s | 8 |

METHOD AND APPARATUS FOR FAST ACCESSING OF DATA ITEMS FROM A SORTED LIST FOR USE WITH SUCH METHOD AND/OR APPARATUS

FIELD OF THE INVENTION

The invention relates to a method for accessing a particular subset of data items from among a multiplicity of data items of a data base contained in a relatively slow background memory, each data item comprising a string of label elements. Accessing of data bases is an old art. The new media of CD-ROM and the like have made the physical carrier containing such data base readily portable, and therefore, many non-computer environments have been found to benefit from the accessibility of such data bases. The prime disadvantage of CD-ROM based systems is the relatively slow accessibility of the disc itself as viewed against the huge data storage therein; in particular for relatively inexpensive versions for widespread consumer use. Access time to a particular data item directly from a CD-ROM may be in the range of 0.5 seconds if only a single disc is present, which is relatively high in regards to human keying speed. A particular field of use of the present invention is for accessing geographical data bases in the physical environment of a motor car.

SUMMARY OF THE INVENTION

Accordingly, amongst other things it is an object of the present invention to provide an improved access mechanism to such data base through the provision of a relatively small but fast foreground memory, and through an appropriate strategy for the access, in particular for arriving at an improved strategy for determining when a part of the data base must be transferred to the foreground memory. Thereto, according to one of its aspects, the invention provides said data base comprising a sequence of blocks together containing said data items and furthermore comprising an index containing a second multiplicity of treewise organized index items each comprising an initial part of a label header of an associated subset of data items, one or more pointers and an indication of whether all data items associated to that initial pan are contained in only a single said block or in a plurality of said blocks, said method comprising the steps of:

storing said index in a relatively fast foreground memory;

with respect to said index detecting of a particular such initial part being called;

then upon finding with respect to the latter initial part said being contained in only a single block, reading the pointer contained in said index item as primary pointer to an associated single block and storing that block in said foreground memory while enabling extending said initial part to a full header for identifying said associated subset, and accessing such subset through its eventually completed label;

but upon finding with respect to the latter initial part said being contained in a plurality of blocks reading any pointer contained in said index item as secondary pointer to a further index item of said tree having the current initial part extended by a next successor label element while enabling selective extending of the current initial part by such next successor label element. By itself, indexing has been described in C. J. Date, An introduction to Database Systems, Vol. I, pp. 58–67, Addison-Wesley, Reading, Mass., USA, 1986. The present invention uses the combination of providing an index and signalling the earliest feasible instant of moving a data base block to the foreground memory in an advantageous manner. The invention is particularly directed to entering of the label through keying, where keying a full label could require 5–10 successive keystrokes, and the detection of the "single-block-contained-ness" could occur after say, five keystrokes, that is well before completion of the keying. If the label itself were produced in parallel by a machine, the advantage would not be so pronounced. The label may be built up from characters, but other constituent parts are feasible, such as bits or tetrades. The labels may have various lengths that may be uniform or not for a particular data base. The labels may have notional elements, such as space characters. Depending on whether a human operator would enter such space character or not, the system, if applicable, would correct to the standard sequence of label elements.

The invention also relates to an apparatus for accessing such data base and to a data base carrier for use with such method and/or apparatus. Further advantageous aspects are recited in dependent claims.

BRIEF DESCRIPTION OF THE DRAWINGS

These and other aspects and advantages will be discussed more in detail with respect to the description of preferred embodiments hereinafter, and in particular with reference to the appended Figures that show in particular:

FIG. 1 a data base for use with the invention;

FIG. 2 more in detail an index;

DESCRIPTION OF PREFERRED EMBODIMENTS

Figure 3:
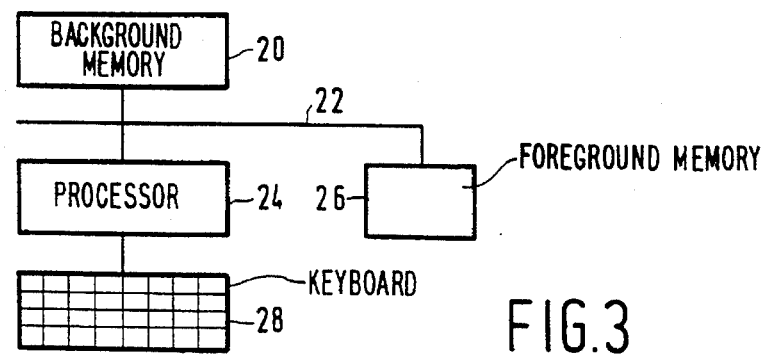
FIG. 3 hardware organized according to the invention.

FIG. 1 shows a data base for use with the invention. The first column gives the physical addresses of the successive data items listed therebehind. Each data item has one line in the Figure and is shown as having a uniform length, but this is not a restriction, inasmuch as data items could occupy more than one line of the data base. Each data item has a unique label shown as a sequence of 2–7 characters. The invention would be just as applicable if the subset of data items with identical labels has more than one entry. The remainder of the data item is stuffed with x-es that all or in part may have some qualifying meaning relative to the data item in question. By way of example, each data item is part of a navigational data base for road vehicles, and relates to a county, city, street, special location, landmark or other entity. The qualifying may indicate a character or other property of the entity. For a street, this may indicate the type of street, such as one-way, the range of housenumbers, connecting streets, and in a dynamic data base even the actual state of accessibility in relation to ongoing repair operations. The labels are alphabetical and sorted alphabetically, but as long as the system knows the underlying principles of the sorting some other kind of ordering among the characters may be used. The data items are grouped in blocks of four; it is understood that transferring of the data items to foreground memory is on the basis of such blocks. The size of the block is tuned to the amount of foreground memory available; the blocks may have different sizes. For example, if the foreground memory would be able to store the first five data items together, the first block could have its size increased to such extent, thus keeping all data items starting with "a" in a single block. This facilitates the subsequent search.

FIG. 2 shows more in detail an index; the index is of such size as to be completely contained within the foreground memory. As in FIG. 1, the first column indicates the addresses of the index items within the index. The remainder of the index for each address has the initial part or header of a label as occurring in the table of FIG. 1. Addresses 1–4 each contain as label header a unique single character a–e. Of these, label header -a- has an indication -p-, meaning that data items with this label header occur in more than a single block in FIG. 1. The same occurs for label header -b-. In consequence, these index items have qualifier p that may be a single bit, and also a pointer to a further index item that has the label header extended with one character. So, addresses 5–7 have two-character label headers starting with -a-, and addresses 8–10 likewise those starting with -b-. Of these, only address 9 points to further index items. The items of the index in effect need effectively to contain only one label character, provided that the system keeps track of all previously entered characters of the label header: the initial part is then only notionally contained in index items of the lower levels of the tree. The pointing may be explicit to all further index items in question, such as by an address range, or to the first (or last) address only, or to the first address of an associated block in the index. Now, most of the index items have an indication -s-, meaning that data items with this label header occur in only a single block in FIG. 1. Next, the first address of the block in question is pointed at. This block then may be transferred from the relatively slow background memory to the relatively fast foreground memory that may have an average access time in the millisecond or microsecond range. During or after the transfer the label header may be further extended by the user for subsequently identifying the location of the subset of data item(s) in question. This may be done by a conventional search mechanism, either on the basis of the full database or still on the basis of the index. The database may have a multilevel index organization, and the index of FIG. 2 could then be part of the highest level index or of a lower level. The data base items need not physically contain the header parts that are present in the index, whether notionally or explicit.

FIG. 3 shows hardware organized according to the invention. Block 20 represents a background memory containing the data base in question, which in a preferred application is a navigational database for use in the proprietary Philips CarIn (Car Information) system for routeplanning, vehicle guiding and other service rendering operations for the user that may be a non-professional in the computer field. Generally, the background memory is read-only, but this is not an express prerequisite for the operation according to the invention. The carrier preferably is an optical storage disc such as a CD-ROM, CD-Interactive, or other similar medium. Such background memory would then contain both the data base proper and also the index. In consequence, the system according to the invention would be embedded in, or at least used in a vehicle such as a police car, taxi, ambulance, van, heavyload truck, limousine, or even a middle class sedan or smaller car. However, other storage media and applications would similarly be feasible with the invention. Block 24 is a computer or other central unit with processing, display, and memory management functionalities. Block 28 is a keyboard or other unit, such as an audio channel for entering user commands and/or data. Block 26 is a relatively fast foreground memory with read-write facility, such as a solid state memory. Element 22 is a bus interconnecting the various subsystems recited supra, and which may furthermore interconnect other elements not shown, such as, for example, audio/video apparatus that is used for displaying certain system data produced by the other elements shown. There is a separate interconnection between foreground memory 26 and central unit 24, either physical or organizational, to facilitate and speed-up interactions between these two units. However, also here, the bus transfer may prevail.

Figure 4:
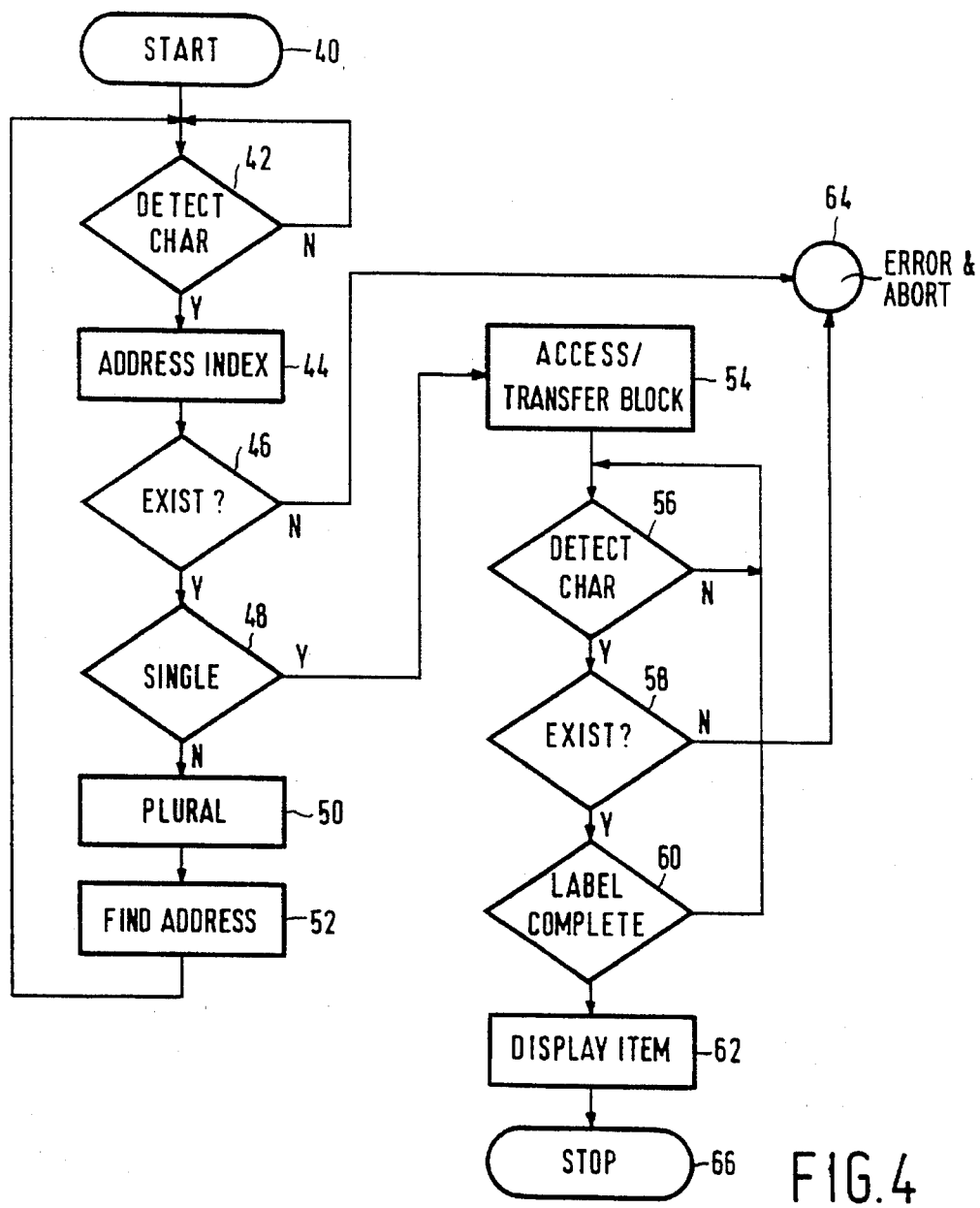
FIG. 4 an exemplary flow chart according to the invention.

FIG. 4 shows an exemplary flow chart according to the invention. Block 40 indicates the start wherein initialization of the system is effected in such way that subsequently the inputting of a data base item is awaited. This means that any further system functionality would be implicit in block 40. In block 42 a character (or other label header element) entering by a user is detected; as long as no character is encountered (N), a waiting loop may be maintained, but this is not necessary. If the character is effectively received, it will address the index, that has been loaded in the foreground memory at an appropriate instant, such as in block 40. Often, all characters are allowed as initial characters, so that the first column of FIG. 2 in fact starts with the whole alphabet. In block 46 the validity of the actual label header is checked. If invalid, the system goes to block 64: error and abort. Another solution is that the system presents the presently allowable choice of the next character as a kind of menu, and just ignores an invalid character. In block 48 the indication -single- is detected with respect to the actual label header. If no, the system goes to block 50, where the indication -plural- is implemented. Then, the address contained in the index item (possibly taking into account header elements that are present only notionally, but have been memorized by the system) is read for anticipating the next character to be received from the keyboard. This next character is then used together with the characters already received in blocks 42, 44, 46, and the loop is cycled as long as the label header is not restricted to a single block in the data base. However, if in block 48 a single block in the data base storage is detected, the system goes to block 54, in which the whole current block from the background storage is transferred. Next, the detection of further characters is done in block 56. In block 58 existence is detected, which is negative, again leads to exiting via block 64. If the label header is not yet complete (block 60), the system reverts to block 56. If the label is complete, however, the data base in block 62 shows the data thereof, and the operation is finished (block 66). The system may be extended according to the reference, such as by more than one level of indexing, which extra level could be situated between the background-foreground memories of FIG. 1. Other modifications would be close at hand to the skilled art practitioner.

We claim:

1. A method for accessing a particular subset of data items from among a multiplicity of data items of a data base contained in a relatively slow background memory, each data item comprising a string of label elements, and said data base comprising a sequence of blocks together containing said data items and furthermore comprising an index containing a second multiplicity of treewise organized index items each comprising an initial part of a label header of an associated subset of data items, one or more pointers and an indication of whether all data items associated to that initial part are contained in only a single said block or in a plurality of said blocks, said method comprising the steps of:

storing said index in a relatively fast foreground memory;

with respect to said index detecting of a particular such initial part being called;

then upon finding with respect to the latter initial part said subset being contained in only a single block, reading the pointer contained in said index item as primary pointer to an associated single block and storing that block in said foreground memory while enabling extending said initial part to a full header for identifying said associated subset, and accessing such subset in the single block through its eventually completed label;

but upon finding with respect to the latter initial part said being contained in a plurality of blocks reading any pointer contained in said index item as secondary pointer to a further index item of said tree having the current initial part extended by a next successor label element while enabling selective extending of the current initial part by such next successor label element.

2. A method as claimed in claim 1, and comprising upon detecting extending by an incongruous element an error signalizing step.

3. An apparatus for accessing a particular subset of data items from among a multiplicity of data items each provided with a string of label elements of a data base, said apparatus containing a relatively slow background memory with first access means and having said data base that comprises a sequence of storage blocks containing said data items and furthermore an index containing a second multiplicity of treewise organized index items each comprising an initial part of its label header, one or more pointers and an indication of whether all data items pertaining to that initial part are contained in only a single said block or in a plurality of said blocks, said apparatus comprising:

a relatively fast foreground memory with second access means;

control means for activating said first access means for storing said index in said foreground memory;

first detecting means for detecting a particular such initial part being called;

second detecting means for detecting with respect to the latter initial part said subset being contained in only a single block, and thereupon under control of a pointer contained in said index item accessing the associated single block and storing that block in said foreground memory while enabling extending said initial part to a said full header of a subset identified thereby and thereupon activating second accessing means for accessing such identified subset of data items;

but for upon finding with respect to the latter initial part said being contained in a plurality of blocks reading any pointer contained in said index item to a further index item of said tree pertaining to the current initial part extended by a next successor label element while enabling selective extending of the current initial part by such next successor label element.

4. An apparatus as claimed in claim 3, wherein said background storage means is an optical disc.

5. Method for accessing a data base comprising the steps of a. maintaining the data base in a relatively slow background memory, the data base comprising a multiplicity of data items organized into a sequence of blocks, each data item comprising a label header which includes a string of label items;

b. maintaining an index in a relatively fast foreground memory, the index containing index items organized as a tree, each index item including i. at least one respective label item that is a respective initial part of the label header of an associated subset of data items in the data base;

ii. at least one respective pointer that points either directly to the associated subset of data items or to another index item; and iii. a respective indication of whether all data items associated with the initial part are contained within a single block of the data base;

detecting calling of a particular one of the respective initial parts in a call for a desired data item;

d. determining from the respective indication whether the particular one is associated with data items contained within a single block;

e. upon a positive result of the determining step,
i. reading the respective pointer for the particular one of the respective initial parts;
ii. copying, to the foreground memory, the single block containing the desired data item;
iii. detecting additional label items for locating the desired data item within the single block; and
iv. locating the desired data item in the foreground memory, based on the additional label items and the index; and f. upon a negative result of the determining step,
i. detecting an additional label item in the call; and
ii. identifying a path along the tree using the particular one of the respective initial parts and an additional index item specified by the additional label item, the path leading to a block containing the desired data item.

6. The method of claim 5 wherein step f, further comprises
iii. iteratively
A. extending a detected label header by detecting label items in the call;
B. identifying further index items upon extensions of the detected label header, based on pointers in previous index items;

v. copying, to the foreground memory, an appropriate single block containing the desired data item, as soon as the appropriate single block is unambiguously identified by the detected label header;

vi. detecting additional label items in the call for locating the desired data item within the appropriate single block; and vii. locating the desired data item in the foreground memory, based on the additional label items and the index.

7. The method of claim 5 wherein the label items contained in at least one index item do not constitute a complete label header.

8. The method of claim 5 wherein the single block is copied to the foreground memory while characters in the call are still being received.

9. Apparatus for accessing a data base comprising:

a. a relatively slow background memory containing a stored data base, the data base comprising a multiplicity of data items organized into a sequence of blocks, each data item comprising a label header which includes a string of label items;

b. a relatively fast foreground memory for storing
i. a retrieved block of the data base and
ii an index containing index items organized as a tree, each index item including
A. at least one respective label item that is a respective initial part of the label header of an associated subset of data items in the data base;

at least one respective pointer that points either to the associated subset of data items or to another index item; and C. a respective indication of whether all data items associated with the initial part are contained within a single block of the data base;

c. a processor which is programmed for
  i. detecting calling of a particular one of the respective initial parts in a call for a desired data item;
  ii. determining from the respective indication whether the particular one is associated with data items contained within a single block;
  iii. upon a positive result of the determining step,
    A. reading the respective pointer for the particular one of the respective initial parts;
    B. copying, to the foreground memory, the single block containing the desired data item;
    C. detecting additional label items for locating the desired data item within the single block; and
    D. locating the desired data item in the foreground memory, based on the additional label items and the index; and
  iv. upon a negative result of the determining step,
    A. detecting an additional label item in the call; and
    B. identifying a path along the tree using the particular one of the respective initial parts and an additional index item specified by the additional label item, the path leading to a block containing the desired data item.

10. The apparatus of claim 9 wherein the processor is further programmed for, upon a negative result of the determining step C. iteratively
  I extending a detected label header by detecting label items in the call; and
  II. identifying further index items upon extensions of the detected label header, by following pointers from previous index items;
D. copying, to the foreground memory, an appropriate single block containing the desired data item, as soon as the appropriate single block is unambiguously identified by the detected label header;
E. detecting additional label items in the call for locating the desired data item within the appropriate single block; and
F. locating the desired data item in the foreground memory, based on the additional label items and the index.

11. The apparatus of claim 9 wherein the background memory is a CD-ROM or other optical disk.

12. The apparatus of claim 9 wherein the label items contained in at least one index do not consitute a complete label header.

13. The apparatus of claim 9 wherein the single block is copied to the forward memory while characters in the call are still being received.

14. Computer storage medium comprising
  a. a stored data base, the data base comprising a multiplicity of data items organized into a sequence of blocks, each data item comprising a label header which includes a string of label items; and
  b. an index, for uploading into a foreground memory, the index containing index items organized as a tree, each index item including
    i. at least one respective label item that is a respective initial part of the label header of an associated subset of data items in the data base;
    ii. at least one respective pointer which points either directly to the associated subset of data items or to another index item; and
    iii. a respective indication of whether all data items associated with the initial part are contained within a single block of the data base.

15. The medium of claim 14 comprising a CD-ROM or other optical disk.

16. The medium of claim 14 wherein the at least one respective label item of the other index item includes the respective initial part of the index item pointing to the other index item plus at least one additional label item.

* * * * *